(12) United States Patent
Doering (10) Patent No.: US 7,425,187 B2
(45) Date of Patent: Sep. 16, 2008

(54) SYSTEM AND METHOD FOR IMPROVED FUEL ECONOMY DURING VEHICLE DECELERATION CONDITIONS

(75) Inventor: Jeff Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 11/191,482

(22) Filed: Jul. 27, 2005

(65) Prior Publication Data
US 2007/0026995 A1 Feb. 1, 2007

(51) Int. Cl.
*B60W 10/04* (2006.01)
(52) U.S. Cl. .................................. 477/107
(58) Field of Classification Search ............... 477/101, 477/102, 104, 105, 107
See application file for complete search history.

(56) References Cited

U.S. PATENT DOCUMENTS

| 6,178,371 B1 * | 1/2001 | Light et al. ............... 701/93 |
| 6,560,523 B2 * | 5/2003 | Kotwicki et al. ............ 701/54 |
| 6,701,246 B2 * | 3/2004 | Riedle et al. .............. 701/110 |

* cited by examiner

*Primary Examiner*—Charles A. Marmmor
*Assistant Examiner*—Derek D Knight
(74) *Attorney, Agent, or Firm*—Julia Voutyras; Alleman Hall McCoy Russell & Tuttle, LLP (57) ABSTRACT

A method of operating an engine of a vehicle having a powertrain having a transmission is described. The method includes, during a driver tip-out condition where the vehicle is decelerating, adjusting engine output based on a gear of the transmission, and reducing airflow to reduce engine torque output without reducing torque by retarding spark timing, following the driver tip-out, until airflow reaches a minimum value below which combustion may be degraded; and upon airflow reach said minimum value, retarding spark timing to further reduce engine output.

18 Claims, 11 Drawing Sheets

SYSTEM AND METHOD FOR IMPROVED FUEL ECONOMY DURING VEHICLE DECELERATION CONDITIONS

FIELD

The present application relates to engine and vehicle control, and in one example relates to operation during vehicle deceleration.

BACKGROUND AND SUMMARY

Engine deceleration control typically focuses on providing acceptable vehicle deceleration control while attempting to minimize transmission lash concerns. For example, various approaches are available for transitioning control from the vehicle operator to idle speed operation during deceleration and gear changes of the transmission.

However, the inventors herein have recognized that when trying to control torque to a desired value, both airflow and spark timing are variables that can affect the torque output. As such, to maximize fuel economy, it would be desirable to provide the desired torque by reducing airflow while keeping spark timing at an optimal value. On the other hand, there may be limitations to the minimum amount of airflow that provides a desired level of combustion smoothness.

Thus, in one example embodiment, a method of operating an engine of a vehicle having a powertrain is provided that includes: during a driver tip-out condition where the vehicle is decelerating, reducing airflow to reduce engine torque output without reducing torque by retarding spark timing, following the driver tip-out, until airflow reaches a minimum value below which combustion may be degraded; and upon airflow reach said minimum value, retarding spark timing to further reduce engine output.

In this way, desired torque trajectories can be obtained while improving fuel economy when possible, and yet avoiding degradation of combustion.

In other embodiments, further improvements in deceleration control can be achieved by additionally providing an improved transition to idle speed operation and reduced engine dips.

DETAILED DESCRIPTION

Figure 1:
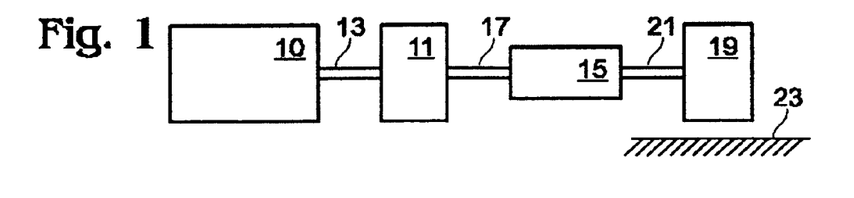
FIG. 1 is a block diagram of a vehicle illustrating various powertrain components.
Figure 2:
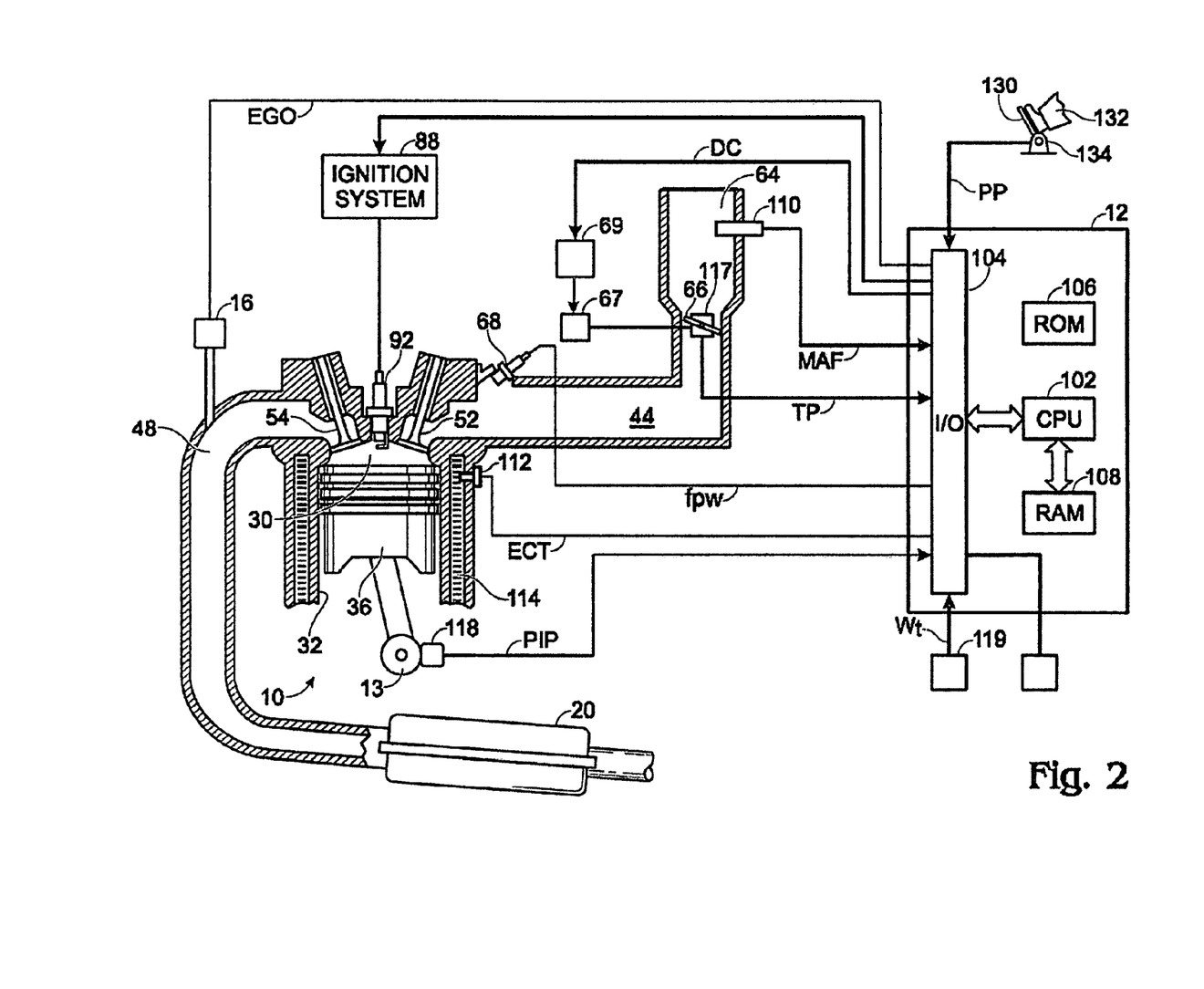
FIG. 2 is a block diagram of an engine.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to tire 19 via axle 21. Tire 19 interfaces the vehicle (not shown) to the road 23. Note that in one example embodiment, this powertrain is coupled in a passenger vehicle that travels on the road.

Internal combustion engine 10 comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As described above, one embodiment is directed toward solving disadvantages that occur when the driver "tips-out" (releases the accelerator pedal) resulting in a selected level of deceleration, which may result in coasting or braking to a stopped condition. In such cases, transmission gear lash conditions may be encountered and traversed, as well as transitions into and/or out of idle speed control.

Figure 3:
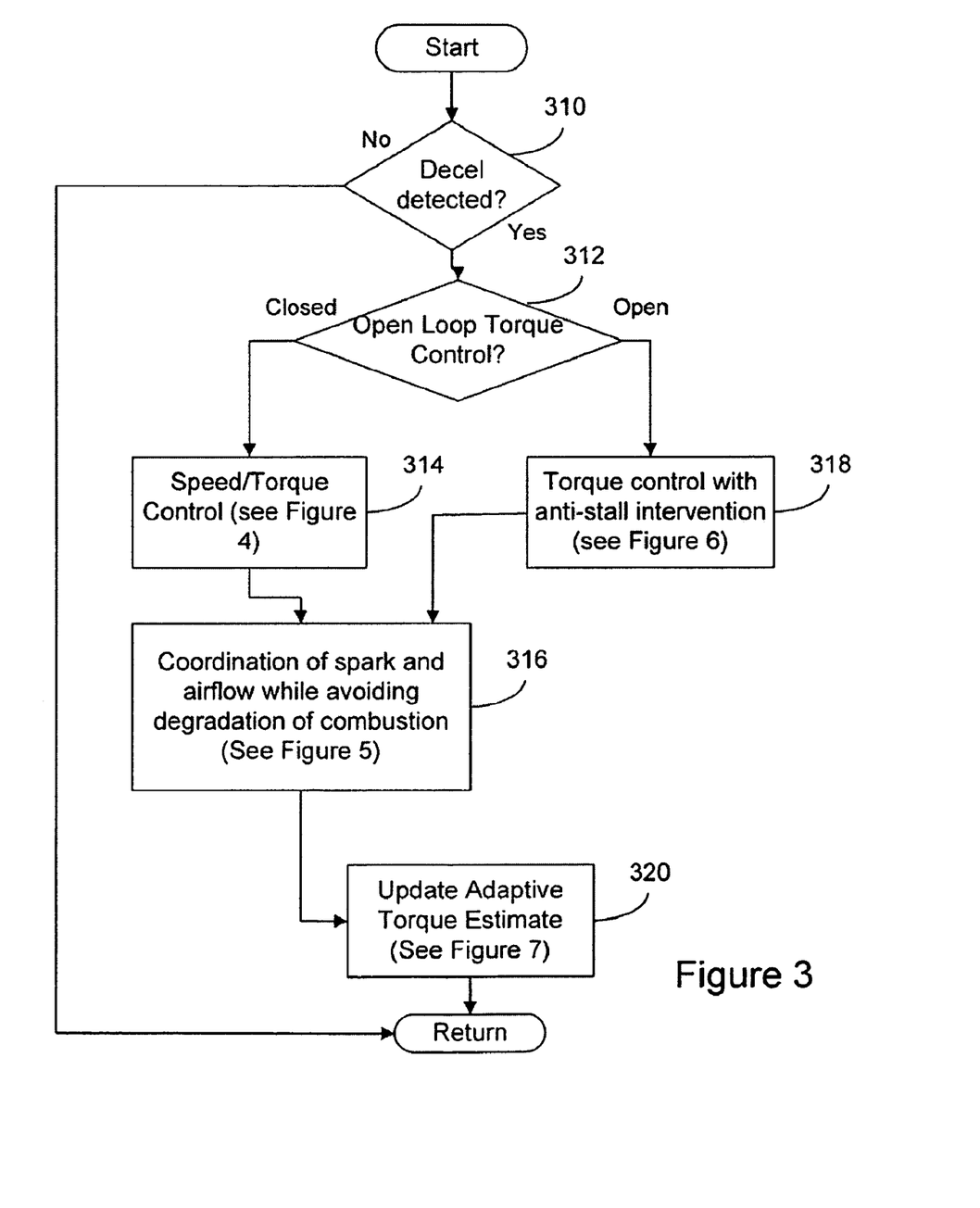
FIGS. 3, 4A, 4C, 4D, and 5 are high level flowchart of a routine for controlling the engine and powertrain.

Referring now to FIG. 3, a routine is described for enabling selected control and/or estimation during deceleration operation. First, in step 310, the routine determines whether a deceleration state is present, or has been identified/detected. For example, such a state may occur during decreasing of vehicle speed, during pedal tip-out by the driver (where pedal position is reduced below a minimum value), deceleration of engine speed, rate of change of desired torque, combinations thereof, or various others. When such conditions are identified, the routine continues to step 316. Otherwise, the routine returns.

Next, in step 312, the routine determines whether conditions are present for open loop torque control and/or closed loop torque control. Such conditions may be based on engine and/or vehicle operating conditions, gear ratio, vehicle speed, and/or others. When closed loop torque control is requested, the routine proceeds to step 314 where speed/torque control is performed as described in more detail below herein with regard to FIGS. 4A-E. Then, the routine proceeds to step 316 where airflow and spark timing are coordinated as described in more detail below herein with regard to FIG. 5. Then, the routine proceeds to step 320 where the adaptive torque estimation is performed as described in more detail below herein with regard to FIG. 7.

Alternatively, when open loop torque control is requested, the routine proceeds to step 318 to control torque with anti-stalling intervention as described in more detail below herein with regard to FIG. 6, before proceeding to steps 316 and 320. From step 320, the routine returns.

Referring now to FIGS. 4A-E, routines are illustrated showing a torque deceleration state machine describing how control actions in response to tip-outs with the vehicle moving in both braking and non-braking gears, transitions between braking and non-braking gears, transitions in and out of neutral gear, blending into idle speed control as the vehicle comes to a stop (including selection between torque requests in engine braking gears and engine speed control in non-engine braking gears), as well as various other features. Note that the speed control operation, as described herein, may include adjusting any of a number of operating parameters so that an actual speed approaches a desired (or target) speed, such as throttle position, airflow, EGR, spark timing, valve timing/lift, or others.

Figure 4A:
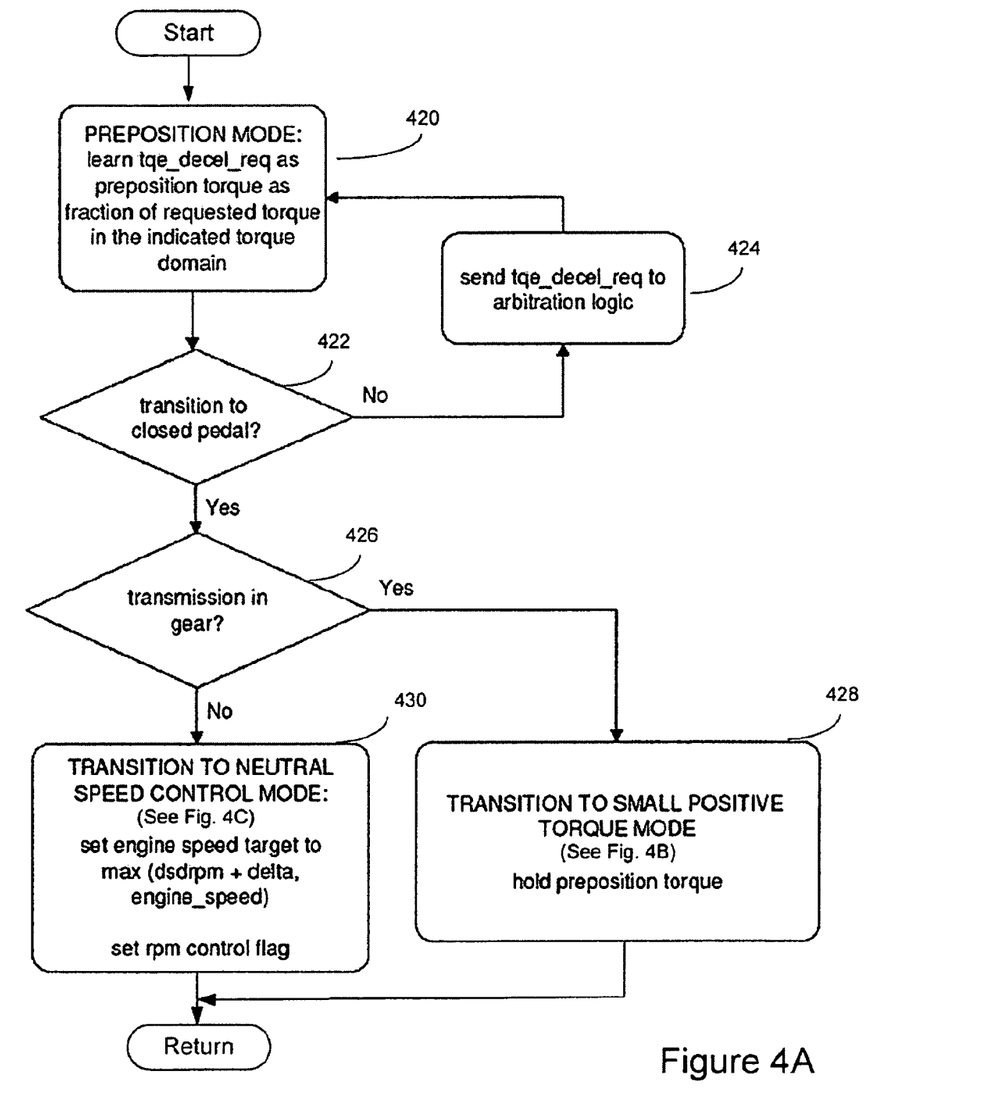

Referring now specifically to FIG. 4A, in step 420 the routine operates in a pre-positioning mode, where the requested (or desired) deceleration torque (tqe_decel_req) is learned as a pre-positioning torque as a fraction of the request torque in the indicated torque domain. Next, in step 422, the routine determines whether a transition to closed pedal is identified. This may be identified by determining that pedal position is less than a preselected amount, for example. If not, the routine continues to step 424 to send the requested deceleration torque to arbitration logic, described below herein with regard to FIGS. 4B-D. Otherwise, the routine continues to step 426 to determine whether the transmission is in a gear, or in neutral. When in gear, the routine continues to step 428 to transition into the mode of FIG. 4B, in which the controller maintains a small positive torque to prevent transitioning through the lash zone by holding the preposition torque.

Figure 4B:
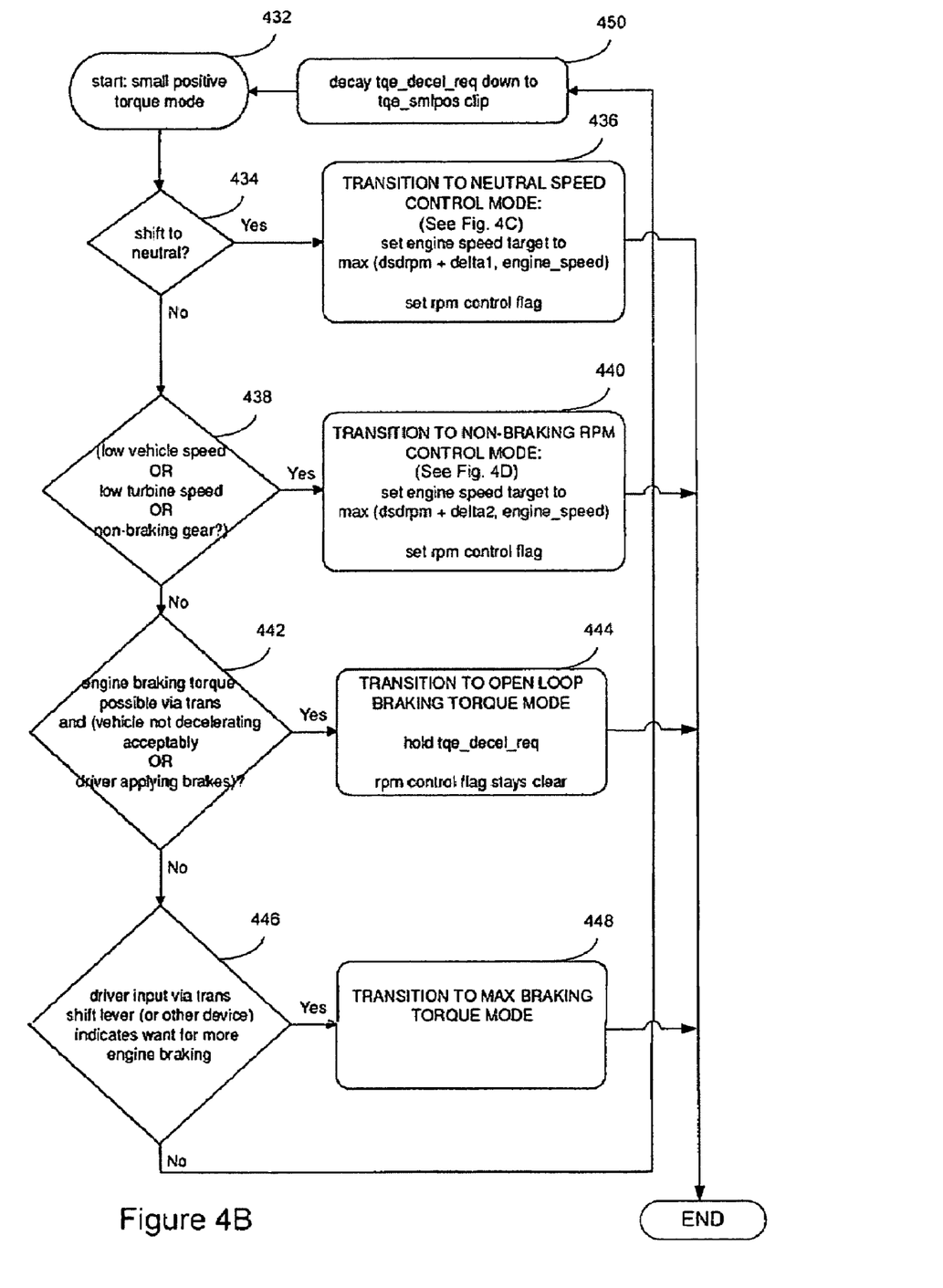
FIGS. 4B, 4E, 6B, and 7 are high level block diagrams of routines.
Figure 4C:
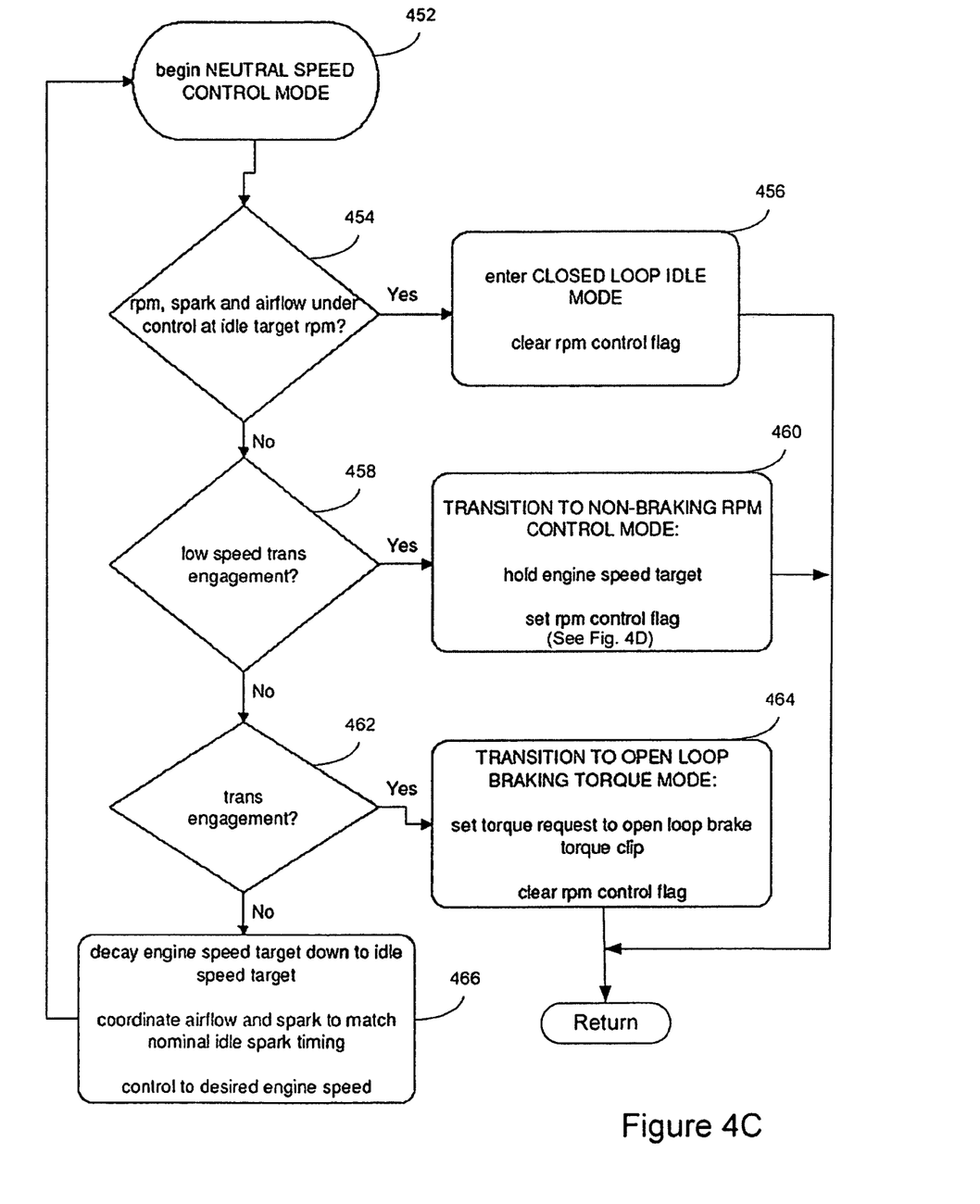

Alternatively, when the answer to step 426 is NO, the routine continues to step 430 to transition to a neutral speed control mode as shown in FIG. 4C, where the engine speed target is set to the maximum of the current engine speed (engine_speed) and the desired engine speed (dsdrpm) plus a calibratable value (delta). Further, in step 430, the routine sets a flag (rpm control flag) to indicate speed control is active.

Referring now to FIG. 4B, a routine describes a mode where a relatively small positive torque is maintained to reduce operation in a gear lash zone. The routine starts at 432 and proceeds to step 434 to determine whether the transmission has shifted into a neutral gear. If so, the routine continues to step 436 to transition into a neutral speed control mode, where the engine speed target is set to the maximum of the current engine speed (engine_speed) and the desired engine speed (dsdrpm) plus a calibratable value (delta1). Further, in step 436, the routine sets the flag (rpm control flag) to indicate speed control is active.

Otherwise, when the answer to step 434 is NO, the routine continues to step 438 to determine whether the vehicle speed is below a threshold, the turbine speed is below a threshold, or the transmission is in a gear that has overrunning clutches and thus may be referred to as a non-braking gear. If so, the routine continues to step 440 to transition into a non-braking speed control mode, where the engine speed target is set to the maximum of the current engine speed (engine_speed) and the desired engine speed (dsdrpm) plus a calibratable value (delta2). Further, in step 440, the routine sets the flag (rpm control flag) to indicate speed control is active.

Otherwise, when the answer to step 438 is NO, the routine continues to step 442 to determine whether engine braking torque is possible via the transmission and whether the vehicle is desired to have increased braking, or if the vehicle driver is applying the brake pedal. If so, the routine continues to step 444 to transition into an open loop braking torque mode, where the torque value tqe_decel_req is controlling in an open-loop manner, and the flag (rpm control flag) is cleared, and thus feedback control of engine speed is disabled (unless stalling may occur, as described herein below).

Otherwise, when the answer to step 442 is NO, the routine continues to step 446 to determine whether the driver is making a change via the shift lever (or other device) to indicate a desire for increased braking. For example, if the driver shifts to a low gear, this can be such an indication. If so, the routine continues to step 448 to transition into an increased braking condition, such as by changing gears into a gear with engine braking, and by transition through a lash zone to generate engine braking torque. Otherwise, the routine continues to step 450 to gradually decay the torque value tqe_decel_req to a minimum small torque clip value (tqe_smlpos clip).

Referring now to FIG. 4C, a routine describes a mode where neutral speed control is provided (e.g., when the transmission is in a neutral gear). The routine starts at 452, and then in step 454, the routine determines whether engine speed, ignition timing, and airflow are each under respectively threshold values while maintaining a target idle speed under feedback control. If so, the routine continues to step 456 to enter closed loop idle sped control, and clear the flag (rpm control flag). Otherwise, the routine continues to step 458 to determine whether a low vehicle speed transmission engagement has occurred. If so, the routine continues to step 460 to transition into a non-braking speed control mode, where the engine speed is held to the target value as described above with regard to step 440. Further, in step 460, the routine sets the flag (rpm control flag) to indicate speed control is active. Otherwise, the routine continues to step 462 to determine whether there has been an engagement of the transmission to a non-neutral gear. If so, the routine continues to step 464 and transitions into an open loop braking torque mode, where the torque request is set to an open loop brake torque value that may be clipped at a set amount of braking torque, and the flag (rpm control flag) is cleared.

Otherwise, the routine continues to step 466, where several actions may be taken. For example, the engine speed target is decayed to the idle speed target speed while airflow and spark are coordinated to match the nominal idle spark timing, and thereby control the speed to the desired engine speed. The routine then returns to step 452.

Figure 4D:
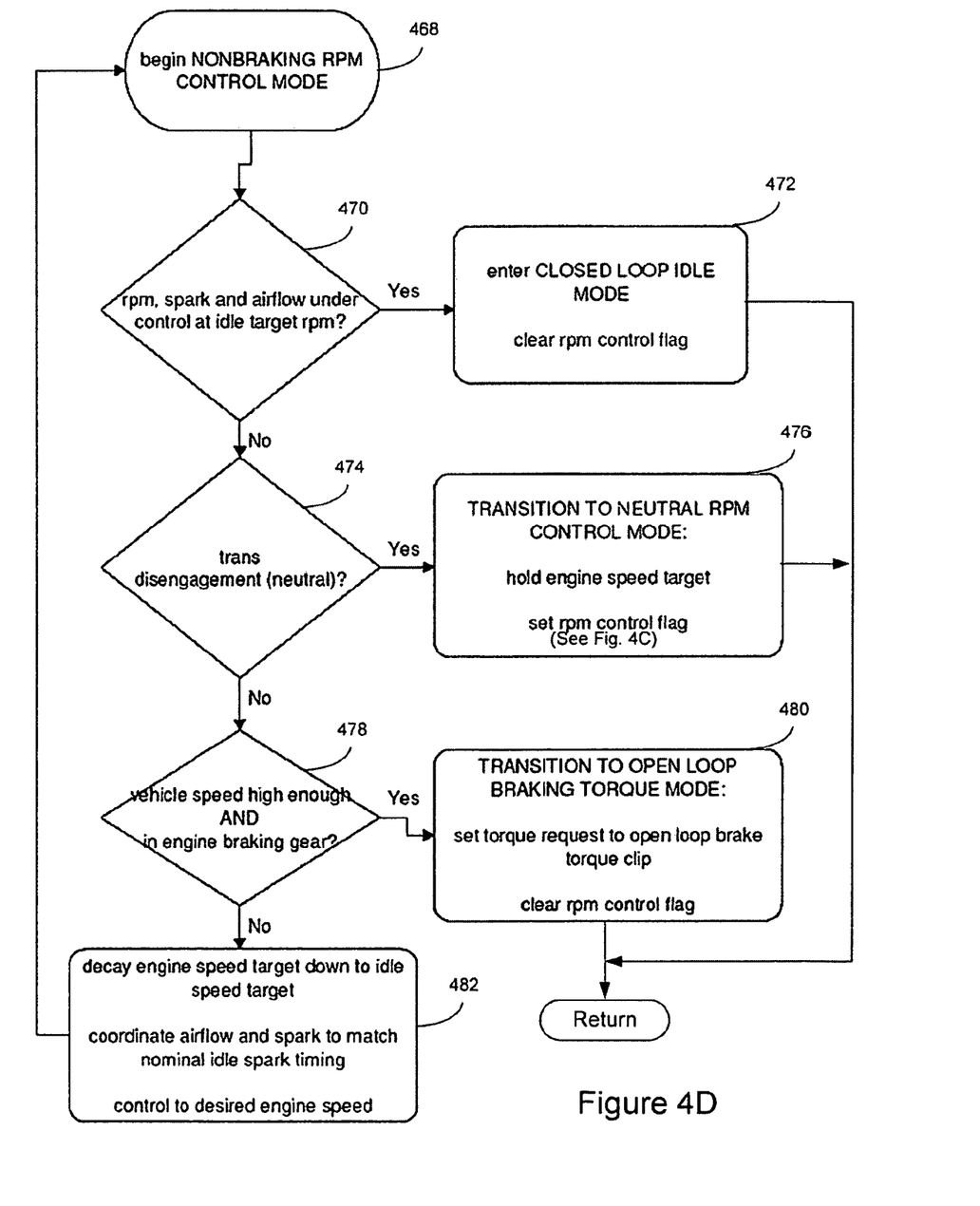

Referring now to FIG. 4D, a routine describes a non-braking engine speed control mode (neutral speed control is provided (e.g., when the transmission is in a neutral gear). The routine starts at 468, and then in step 470, the routine determines whether engine speed, ignition timing, and airflow are each under respectively threshold values while maintaining a target idle speed under feedback control. If so, the routine continues to step 472 to enter closed loop idle sped control, and clear the flag (rpm control flag). Otherwise, the routine continues to step 474 to determine whether a transmission dis-engagement has occurred (e.g., shift into neutral). If so, the routine continues to step 476 to transition into a neutral speed control mode, where the engine speed target is held at the target value (as described above herein wither regard to step 436 and FIG. 4C). Further, in step 476, the routine sets the flag (rpm control flag) to indicate speed control is active.

Otherwise, the routine continues to step 478 to determine whether the vehicle speed is above a threshold speed and the transmission is in a gear that can provide engine braking (e.g., without an over-running clutch). If so, the routine continues to step 480 and transitions into an open loop braking torque mode, where the torque request is set to an open loop brake torque value that may be clipped at a set amount of braking torque, and the flag (rpm control flag) is cleared. If the answer to step 478 is NO, the routine continues to step 482 where several actions may be taken. For example, the engine speed target is decayed to the idle speed target speed while airflow and spark are coordinated to match the nominal idle spark timing, and thereby control the speed to the desired engine speed. The routine then returns to step 468.

Figure 4E:
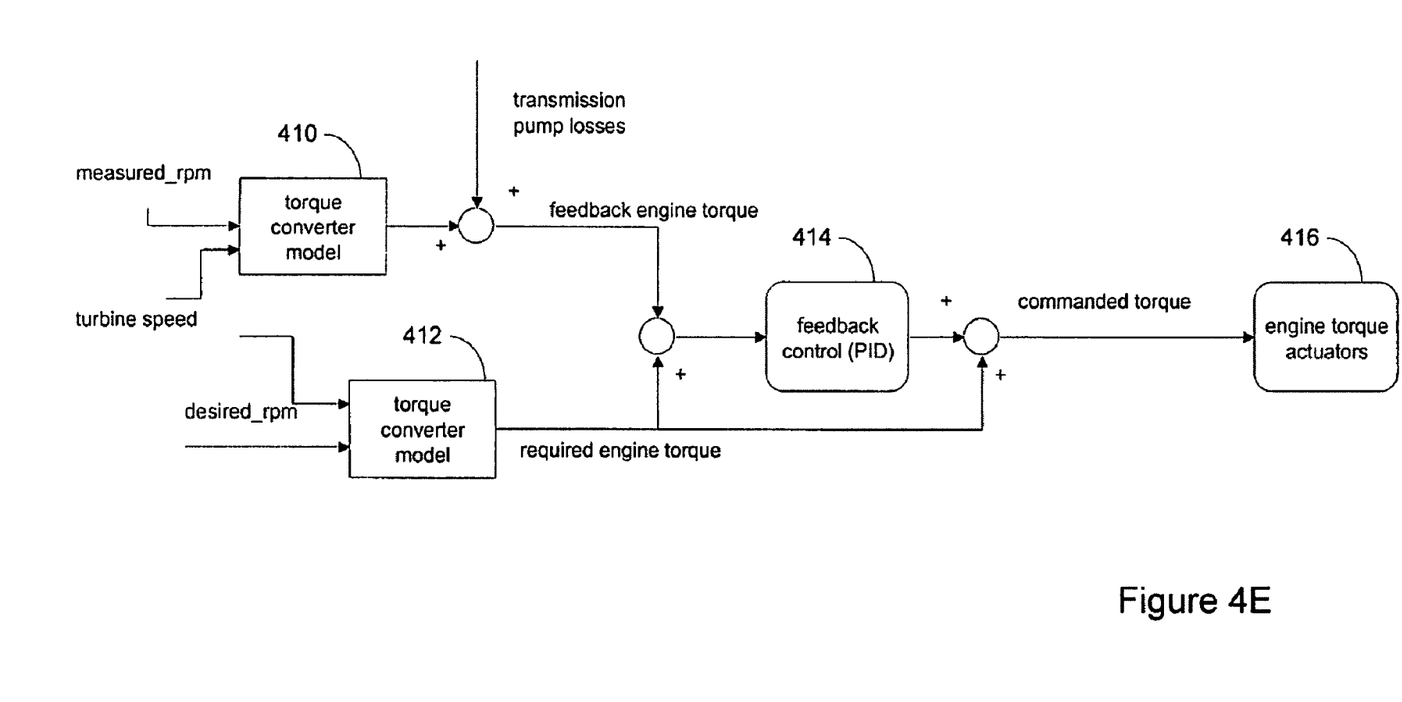

Referring now to FIG. 4E, a detailed block diagram is provided for performing torque estimation/control and engine speed control/limiting that can be used in the routines described above with regard to FIGS. 4A-D. In one embodiment, the approach described herein can add additional robustness to the system as turbine speed is changing with vehicle speed and gear shifts on decals. Such operation is obtained at least partially by using a feedback loop on engine speed to ensure that engine speed does not drop (or that any drop is reduced) due to noise factors (e.g., errors in torque models, combustion degradation, combination thereof, and others). As described herein, a torque converter model is used as a way to linearize engine speed errors into the torque domain to improve controller response, where the relationship between torque converter torques and speeds may be highly non-linear. In this way, it is possible to improve system robustness.

Specifically, FIG. 4E shows a block diagram where inputs include engine speed measured from a crankshaft sensor (measured_rpm), turbine speed (which may be measured or estimated from other sensors), and a desired engine speed (desired_rpm). Various other inputs may be used in addition, or in the alternative, if desired. Block 410 represents a torque converter model, which may include static and dynamic elements representing the transformation of measured engine speed and turbine speed to torque transmission values (absolute and/or ratios). Then, this torque output is adjusted for transmission pump losses (which can be estimated based on various values, such as speed, temperature, and/or others) to form an estimated engine torque value. This estimated torque value is used as feedback to be compared with a required engine torque calculated in block 412. Specifically, the required engine torque is determined in block 412 using the same or similar model as in block 410, except using desired engine speed and turbine speed. From the comparison between the required and estimated torque, an error signal is feed to block 414, which represents a controller. In one example, the controller can be a PID (proportional, integral, and derivative) controller, although other types of controllers may be used if desired. The output of the controller is used along with the required torque in a feedforward manner to produce a commanded torque value that is sent to the torque actuators (e.g., fuel injectors, throttle, spark, etc.) in block 416.

Figure 5:
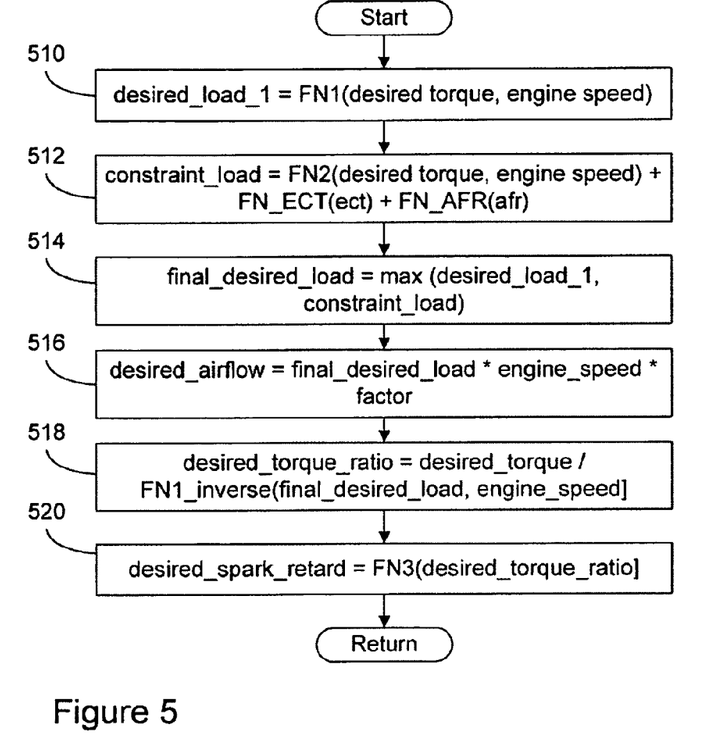

Referring now to FIG. 5, a routine is described for controlling two independent variables (ignition timing and airflow) during deceleration to improved fuel economy while achieving a desired engine torque (which may also be a function of airflow and spark). Specifically, the routine describes an example approach to control these variables while also avoiding degraded combustion at low airflow (or air charge) conditions, even though the onset of combustion degradation may be a function of both airflow and spark timing. In one example, this is also done in a way that the control interfaces smoothly between conditions where action is taken to reduce likelihood of degraded combustion, and conditions where no intervention action is take so as not to use excessive spark retard (and therefore improve fuel economy). Further, while the example below is described for stoichiometric operating conditions, it may also be applied to variation in the on-set of potentially degraded combustion with variation in engine temperature and/or air-fuel ratio, such as with lean operating conditions.

Referring now specifically to FIG. 5, in step 510, the routine determines a desired load (or cylinder air charge) based on a first function (FN1) of desired torque and engine speed. In one example, the engine speed is measured from a crankshaft position, and desired torque may be determined from the driver pedal actuation, vehicle speed, gear ratio, combinations thereof, or other parameters such as cruise control operation, vehicle stability control, or traction control operation.

Next in step 512, the routine determines a minimum allowed load (constraint_load) based on a second function (F2) of desired torque and engine speed, as well as based on a functions of engine coolant temperature (ECT) and desired or actual air-fuel ratio (afr). In one example, the minimum allowed load can be calibrated to be a load below which combustion may be degraded (such as degraded by a selected amount, which may be substantially zero).

Then, in step 514, the routine determines the maximum (final_desired_load) of the desired load and minimum allowed load. Next, in step 516, the routine determines a desired airflow from the maximum value, engine speed, and various conversion factors to translate load (or cylinder charge) into a mass airflow. From this value, a desired torque ratio can be determined in step 518 using the inverse of function 1 (FN1) and engine speed. This ratio is then used to determine a desired amount of ignition timing adjustment (e.g., retard) in step 520 using a calibratable function (FN3). Then, the routine returns.

Figure 6A:
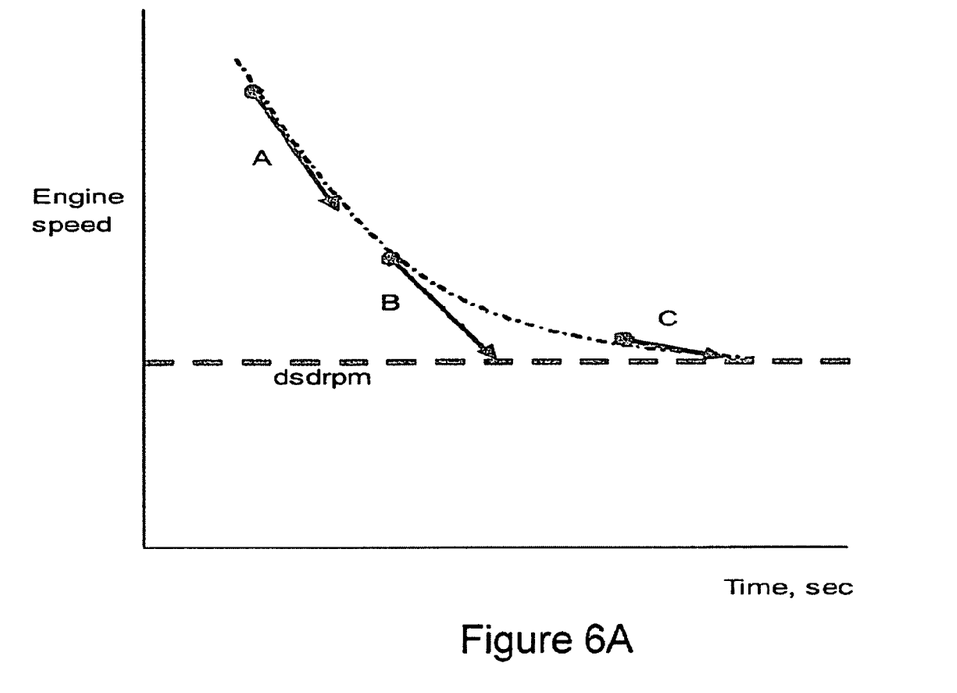
FIG. 6A are graphs illustrating example engine operation.

Referring now to FIG. 6A, a routine is described for operating in an open-loop torque control mode, yet providing intervention to reduce engine speed drops and/or stalls. Specifically, in one example, the routine provides a desired torque that is adjusted for engine acceleration for improved response to calculation errors and/or external disturbances and/or variations. Specifically, in prior approaches, the desired torque to prevent speed drops was a function of a difference between a desired engine idle speed and measured engine speed. Rather than relying simply on engine speed error, in one example described below both the engine acceleration and the acceptable level of deceleration are considered. As shown in FIG. 6A, the dashed curved line reflects an acceptable engine speed trajectory decaying to desired idle RPM (dsdrpm). The originating circle for each of the arrows shows the current engine speed for cases A, B and C. The slope of the arrows represent the engine acceleration at that point in time, so that the end of the arrow can be viewed as a look-ahead engine speed a constant amount of time into the future. Comparing B and C, the current engine speed for case B is further from dsdrpm and prior approaches would calculate a higher torque for case C, which may produce degraded performance. To overcome this issue, these different conditions were distinguished by first utilizing the difference between the engine acceleration and an acceptable rate of deceleration, and then use that delta acceleration and a prediction time.

Figure 6B:
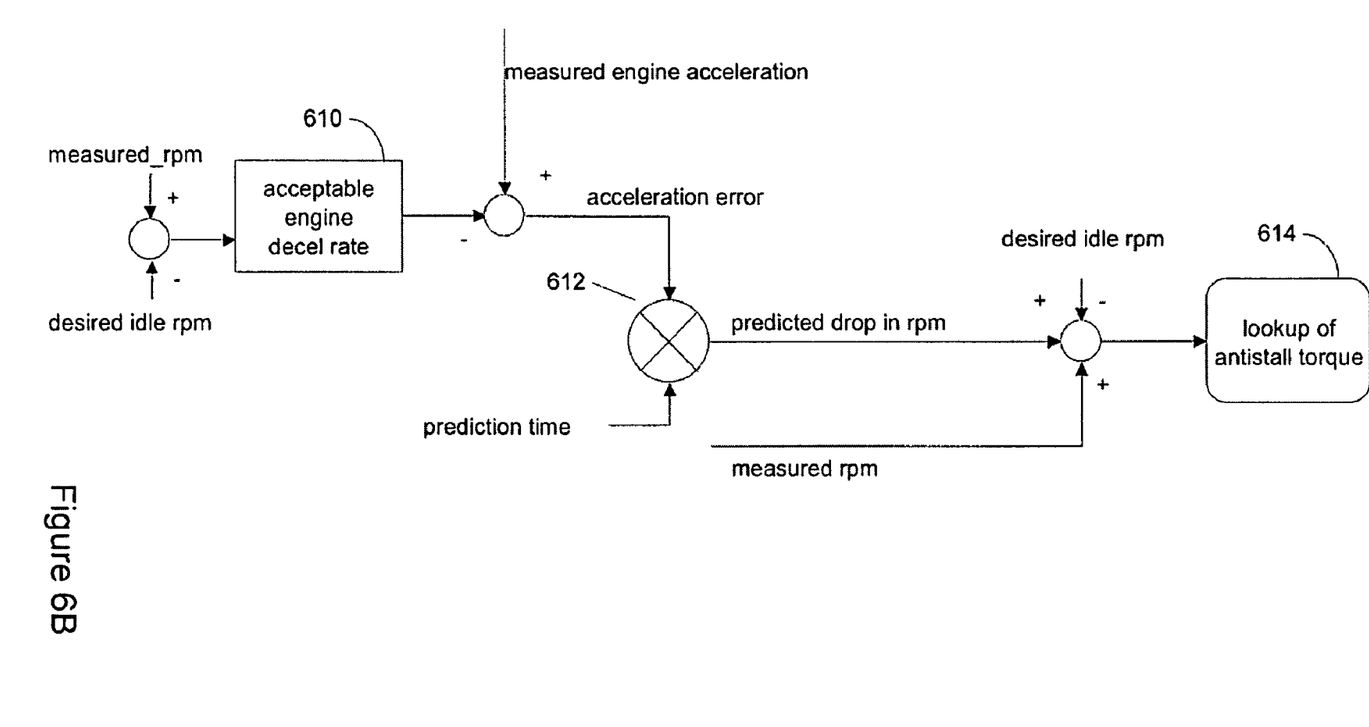

Such an approach is illustrated in FIG. 6B, which shows an example block diagram control system. Inputs to the control system include engine speed measured from a crankshaft sensor (measured_rpm), a desired idle RPM speed value, engine acceleration (which can be obtained by processing the speed signal, and a prediction time (as described above herein). First, the measured and desired speeds are compared to determine an acceptable engine deceleration value in block 610. Then, this acceleration value is compared with a measured acceleration value, and then multiplied by the prediction time to obtain a predicted drop in engine speed from 612. Then, this predicted drop in speed is compared to the measured speed and desired speed values, and then used in a look-up table in 614 to determine a desired engine torque to be provided to obtain the desired response.

In this way, it is possible to provide more robust engine speed control to reduce dips and/or stalls for a wide variety of noise factors during deceleration operation.

Figure 7:
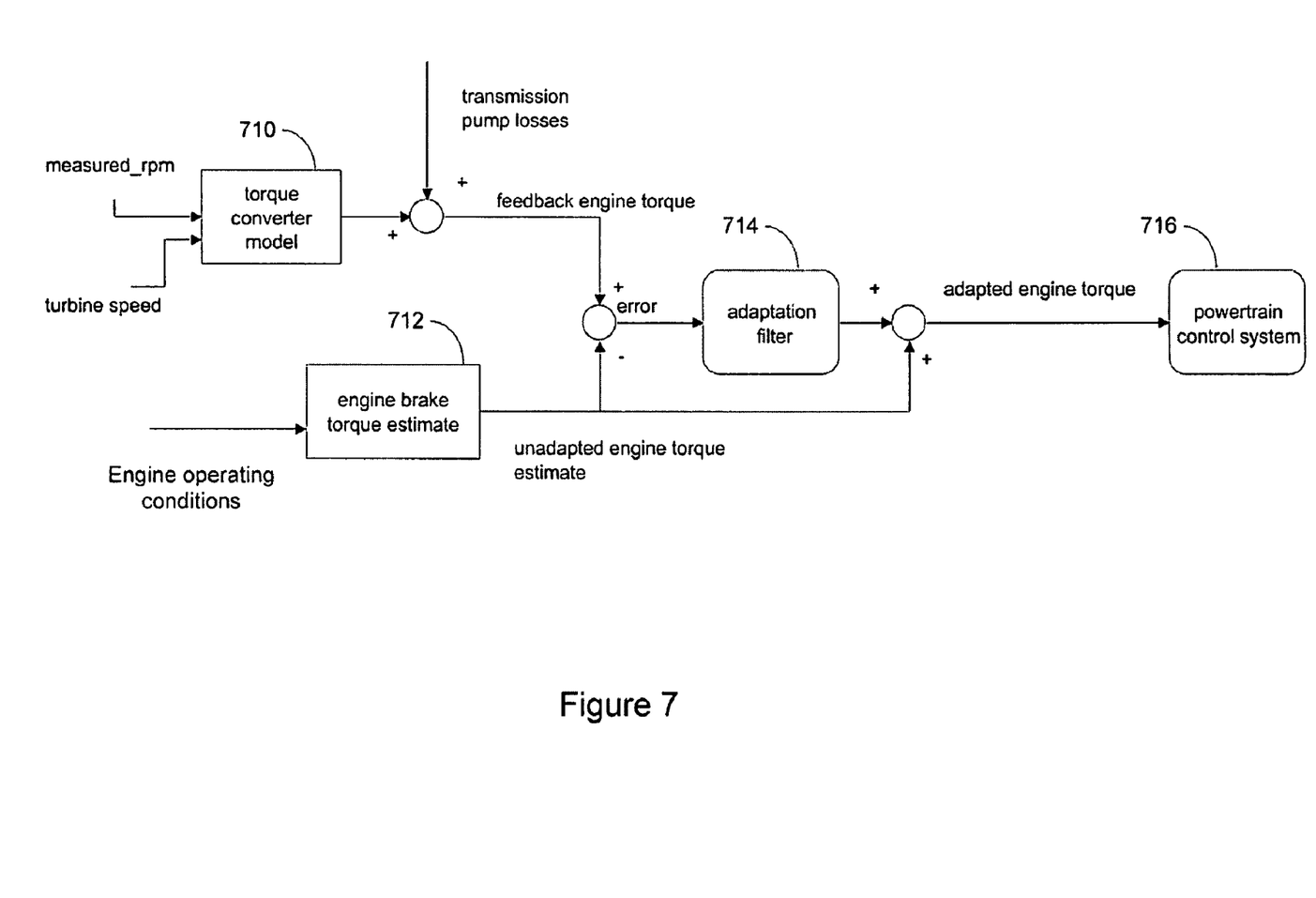

Referring now to FIG. 7, a block diagram of an estimation system is shown for adapting engine torque estimates. Inputs to the system include engine speed measured from a crankshaft sensor (measured_rpm), turbine speed (which may be measured or estimated from other sensors, transmission pump losses, and other engine operating parameters (e.g., speed, load, engine coolant temperature (ECT), estimates of torque from front end accessory devices (FEAD), and others). Various other inputs may be used in addition, or in the alternative, if desired. Block 710 represents a torque converter model, which may include static and dynamic elements representing the transformation of measured engine speed and turbine speed to torque transmission values (absolute and/or ratios). Then, this torque output is adjusted for transmission pump losses (which can be estimated based on various values, such as speed, temperature, and/or others) to form an estimated engine torque value. This estimated torque value is used as feedback to be compared with an estimated engine torque based on engine operating conditions (e.g., airflow, fuel, spark timing, etc.) calculated in block 712. From the comparison between the required and estimated torque, an error signal is feed to block 714, which represents an adaptation filter. In one example, the filter can be a simplified low pass filter,, although other types of filters may be used if desired. The output of the filter is used along with the unadapted engine torque estimate in a feedforward manner to produce an adapted engine torque value that is sent to the powertrain control system for use as described herein, such as for feedback engine torque control, in block 716.

Such an approach enables adaptation even when considering that engine brake torque may not be zero when torque converter slip is zero because impeller torque=engine brake torque−trans pump torque. Variability in trans pump torque (which can be large, especially in CVTs) can thus be appropriately considered in this embodiment. Further, such an approach can be used for both positive and negative slip across the torque converter. Thus, such an approach is robust to variation in transmission pump losses and can adjust engine torque estimation errors for varying levels of slip.

As will be appreciated by one of ordinary skill in the art, the specific routines and block diagrams described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

It will be appreciated that the configurations and embodiments disclosed herein are exemplary in nature, and that these specific embodiments are not to be considered in a limiting sense, because numerous variations are possible. For example, the above valve can be applied in a variety of areas, including various types of engines, such as V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method of operating an engine of a vehicle having a powertrain, the method comprising:
   during a driver tip-out condition where the vehicle is decelerating, reducing airflow to reduce engine torque output to a desired engine torque without reducing torque by retarding spark timing, following the driver tip-out, until airflow reaches a minimum value below which combustion may be degraded, wherein the desired engine torque controls engine deceleration while approaching a desired engine idle speed during vehicle deceleration; and
   upon airflow reach said minimum value, retarding spark timing to further reduce engine output.

2. The method of claim 1 where an actual engine torque is estimated based on characteristics of torque converter coupled to said engine in the powertrain and based on engine operating conditions.

3. The method of claim 2 wherein said engine is coupled to a continuously variable transmission via said torque converter.

4. The method of claim 3 wherein said engine torque estimate takes into account transmission spin losses of said continuously variable transmission.

5. The method of claim 1 wherein during said deceleration, said engine output torque is adjusted to transition through a transmission lash zone at a reduced rate.

6. The method of claim 1 wherein during said deceleration, said engine output torque is adjusted based on whether an operator is applying brakes of the vehicle.

7. The method of claim 1 wherein during said deceleration, operating in at least a first mode where positive powertrain torque is provided to reduce operation through a transmission lash zone, and in response to actuation of a brake pedal by the driver, transitioning through said lash zone.

8. The method of claim 1 wherein during said deceleration, operating in at least a second mode where positive powertrain torque is provided to reduce operation through a transmission lash zone, and said positive torque is maintained while vehicle speed is below a threshold value.

9. The method of claim 1 wherein during said deceleration, operating in at least a third mode where positive powertrain torque is provided to reduce operation through a transmission lash zone, and said positive torque is maintained while turbine speed is below a predetermined value.

10. The method of claim 1 wherein during said deceleration, operating in at least a fourth mode where positive powertrain torque is provided to reduce operation through a transmission lash zone, and said positive torque is maintained while the transmission is in a non-braking gear.

11. The method of claim 1 wherein during said deceleration, operating in at least a first mode where positive powertrain torque is provided to reduce operation through a transmission lash zone, and in response to a change in a driver shift lever by the driver transitioning through said lash zone to generate braking torque.

12. A method of operating an engine of a vehicle having a powertrain having a transmission, the method comprising:
   during a driver tip-out condition where the vehicle is decelerating, adjusting engine output based on a gear of the transmission, and reducing airflow to reduce engine torque output to a desired engine torque without reducing torque by retarding spark timing, following the driver tip-out, until airflow reaches a minimum value below which combustion may be degraded, wherein the desired engine torque controls engine deceleration while approaching a desired engine idle speed during vehicle deceleration; and
   upon airflow reach said minimum value, retarding spark timing to further reduce engine output.

13. The method of claim 12 wherein during said deceleration, operating in at least a first mode where positive powertrain torque is provided to reduce operation through a transmission lash zone, and in response to actuation of a brake pedal by the driver, transitioning through said lash zone.

14. The method of claim 13 wherein during said deceleration, operating in at least a second mode where positive powertrain torque is provided to reduce operation through a transmission lash zone, and said positive torque is maintained while vehicle speed is below a threshold value.

15. The method of claim 14 wherein during said deceleration, operating in at least a third mode where positive powertrain torque is provided to reduce operation through a transmission lash zone, and said positive torque is maintained while turbine speed is below a predetermined value.

16. The method of claim 15 wherein during said deceleration, operating in at least a fourth mode where positive powertrain torque is provided to reduce operation through a transmission lash zone, and said positive torque is maintained while the transmission is in a non-braking gear.

17. A system for a passenger vehicle traveling on the road, the system comprising:
   an engine;
   a continuously variable transmission coupled to said engine via a torque converter; and
   a controller configure to adjust engine output based on a gear ratio of the transmission during a driver tip-out condition where the vehicle is decelerating, and during said deceleration, reducing airflow to reduce engine torque output to a desired engine torque without reducing torque by retarding spark timing, following the driver tip-out, until airflow reaches a minimum value below which combustion may be degraded, wherein the desired engine torque controls engine deceleration while approaching a desired engine idle speed during vehicle deceleration, and upon airflow reach said minimum value, retarding spark timing to further reduce engine output.

18. The system of claim 17 wherein said controller is further configured to manage torque during transition through a lash zone.

* * * * *